United States Patent
Kholkar et al.

(10) Patent No.: US 10,339,537 B2
(45) Date of Patent: Jul. 2, 2019

(54) SYSTEM AND METHOD FOR AUTOMATED REGULATORY COMPLIANCE CHECKING FOR ORGANIZATIONS

(71) Applicant: Tata Consultancy Services Limited, Mumbai (IN)

(72) Inventors: Deepali Kholkar, Pune (IN); Sagar Sunkle, Pune (IN); Vinay Kulkarni, Pune (IN)

(73) Assignee: Tata Consultancy Services Limited, Mumbai (IN)

( * ) Notice: Subject to any disclaimer, the term of this patent is extended or adjusted under 35 U.S.C. 154(b) by 374 days.

(21) Appl. No.: 15/434,819

(22) Filed: Feb. 16, 2017

(65) Prior Publication Data
US 2017/0236129 A1 Aug. 17, 2017

(30) Foreign Application Priority Data
Feb. 16, 2016 (IN) .............................. 201621005427

(51) Int. Cl.
*G06F 17/27* (2006.01)
*G06Q 30/00* (2012.01)
*G06Q 40/02* (2012.01)

(52) U.S. Cl.
CPC ....... *G06Q 30/018* (2013.01); *G06F 17/2785* (2013.01); *G06Q 40/02* (2013.01)

(58) Field of Classification Search
CPC .................................................. G06F 17/2785
USPC ......................................................... 707/803
See application file for complete search history.

(56) References Cited

U.S. PATENT DOCUMENTS

2011/0208662 A1* 8/2011 Haunschild ............ G06Q 10/10
 705/317
2015/0302420 A1* 10/2015 Nair ..................... G06Q 30/018
 705/317

OTHER PUBLICATIONS

Kharbili et al., "Towards a Framework for Semantic Business Process Compliance Management", Proceedings of GRCIS 2008, pp. 1-15, (2008) Link: http://citeseerx.ist.psu.edu/viewdoc/download?doi=10.1.1.472.1663&rep=rep1&type=pdf.

(Continued)

*Primary Examiner* — Joshua Bullock
(74) *Attorney, Agent, or Firm* — Finnegan, Henderson, Farabow, Garrett & Dunner LLP

(57) ABSTRACT

A system and method for automated regulatory compliance checking for organizations is disclosed. The present subject matter discloses a method for generating queries to extract relevant data from an organization that with respect to the regulatory rules and subsequently performing automated compliance checking for the organization. In an embodiment, the system captures regulatory rules provided by a regulatory body for an organization and extracts logical specification of rules from the semantic model in DR-Prolog language. The system further extracts a conceptual data model from the semantic model and obtains mapping between the conceptual data model and plurality of physical database. The system generates queries and translated the queries on to physical database schema to extract relevant data from the organization. The extracted data is transformed into ground facts in DR-Prolog and compared with logical specification of rules to perform automated regulatory compliance checking.

11 Claims, 5 Drawing Sheets

(56) References Cited

OTHER PUBLICATIONS

Ghose et al., "Auditing business process compliance", Proceedings of the International Conference on Service-Oriented Computing (ICSOC-2007), Springer Berlin Heidelberg, 13 pages, (2007).

* cited by examiner

SYSTEM AND METHOD FOR AUTOMATED REGULATORY COMPLIANCE CHECKING FOR ORGANIZATIONS

PRIORITY CLAIM

This U.S. patent application claims priority under 35 U.S.C. § 119 to: India Provisional Application No. 201621005427, filed on Feb. 16, 2016. The entire contents of the aforementioned application are incorporated herein by reference.

TECHNICAL FIELD

The embodiments herein generally relates to compliance checking and, more particularly to automated regulatory compliance checking for an organizations.

BACKGROUND

Generally, organizations are required to adhere to compliance requirements that are set by government and various regulatory bodies. All forms of organizations are subject to compliance of a variety of forms of regulation from an assortment of regulatory bodies. However, increasing compliance requirements for an organization are leading to a tougher operating environment for the organization. Regulators are taking stronger actions against non-compliance by imposing huge penalties and causing potential loss of reputation for non-compliant party.

The inventors here have recognized several technical problems with such conventional systems, as explained below. The organizations for example, banks are seeing rising costs of compliance as a percentage of overall expenditure due to extensive reporting requirements by any regulatory body. Further, it is cumbersome for the banks to be updated with changes or additions in regulations. Such banks need to ensure regulatory compliance. As a result, such banks chose to invest in separate silos of compliance technology each time a regulation is added/modified. This produces a challenge for balancing the cost of compliance and at the same time drive revenue growth.

SUMMARY

Embodiments of the present disclosure present technological improvements as solutions to one or more of the above-mentioned technical problems recognized by the inventors in conventional systems. For example, in one embodiment, a method for automated regulatory compliance checking for organizations is disclosed. The method includes obtaining a semantic model of regulatory rules that are to be complied by an organization. Further, the method includes extracting logical specification of rules from the semantic model of regulatory rules in DR-Prolog language. Further, the conceptual data model is extracted from the semantic model by traversing the semantic model. The conceptual data model consists of propositions on which regulatory rules depend. The schema mapping between the conceptual data model and the plurality of database of an organization is obtained. The queries are generated on the conceptual data model and subsequently translated into queries on physical database schema using the schema mapping to extract the relevant data. The extracted relevant data is transformed into DR-Prolog language using model-to-text transformation. Further, utilizing the extracted relevant data and the logical specification of rules to perform automated regulatory compliance checking.

In another embodiment, a system for automated regulatory compliance checking for organizations is disclosed. The method includes obtaining a semantic model of regulatory rules that are to be complied by an organization. Further, the system includes extracting logical specification of rules from the semantic model of regulatory rules in DR-Prolog language. Further, the conceptual data model is extracted from the semantic model by traversing the semantic model. The conceptual data model consists of propositions on which regulatory rules depend. The schema mapping between the conceptual data model and the plurality of database of an organization is obtained. The queries are generated on the conceptual data model and subsequently translated into queries on physical database schema using the schema mapping, to extract the relevant data. The extracted relevant data is transformed into DR-Prolog language using model-to-text transformation. Further, utilizing the extracted relevant data and the logical specification of rules to perform automated regulatory compliance checking.

In yet another embodiment, a non-transitory computer readable medium embodying a program executable in a computing device for automated regulatory compliance checking for organizations is disclosed. The one or more instructions which when executed by one or more hardware processors causes obtaining a semantic model of regulatory rules that are to be complied by an organization. Further, logical specification of rules are extracted from the semantic model of regulatory rules in DR-Prolog language. Further, the conceptual data model is extracted from the semantic model by traversing the semantic model. The conceptual data model consists of propositions on which regulatory rules depend. The schema mapping between the conceptual data model and the plurality of database of an organization is obtained. The queries are generated on the conceptual data model and subsequently translated into queries on physical database schema using the schema mapping, to extract the relevant data. The extracted relevant data is transformed into DR-Prolog language using model-to-text transformation. Further, utilizing the extracted relevant data and the logical specification of rules to perform automated regulatory compliance checking.

It is to be understood that both the foregoing general description and the following detailed description are explanatory only and are not restrictive of the invention, as claimed.

DETAILED DESCRIPTION OF THE INVENTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

The present technique provides a model for automated regulatory compliance checking for an organization. The system captures regulatory rules and obtains a semantic model for the regulatory rules. The logical specification of rules are extracted from the semantic model in DR-Prolog language. Further a conceptual data model is extracted from the semantic model. Further, schema mapping between the semantic model and the plurality of physical databases is obtained. Further queries are generated on conceptual data model and the queries are translated into queries on physical database to extract relevant data. The data is translated to DR-Prolog language and compared to logical specification of rules to perform automated regulatory compliance checking.

The manner in which the described system is implemented to evaluate reviewer's ability to provide feedback has been explained in detail with respect to the following figure(s). While aspects of the described system can be implemented in any number of different computing systems, transmission environments, and/or configurations, the embodiments are described in the context of the following exemplary system.

Figure 1:
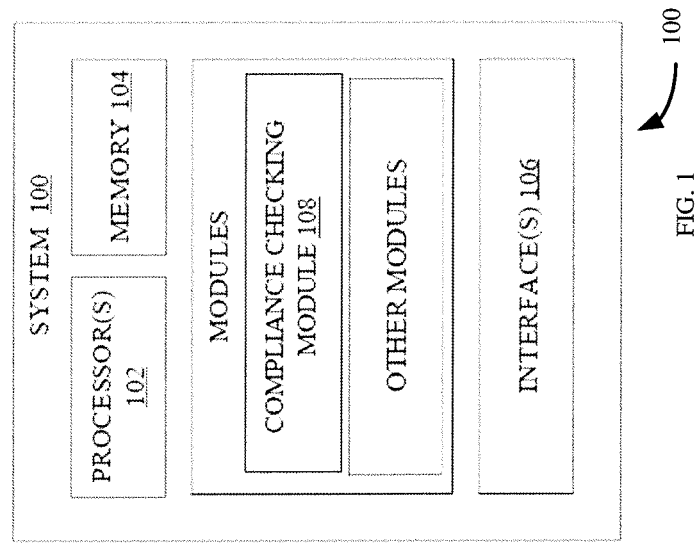
FIG. 1 illustrates a system for automated regulatory compliance checking for organizations, according to an embodiment of the present disclosure.

FIG. 1 illustrates a system 100 for automated regulatory compliance checking for an organization. As shown in FIG. 1, the system 100 includes one or more processor(s) 102, a memory 104, and interface(s) 106 communicatively coupled to each other. Further, the memory 104 includes a compliance checking module 108. The processor(s) 102, the memory 104, and the interface(s) 106 may be communicatively coupled by a system bus such as a system bus or a similar mechanism. Although FIG. 1 shows example components of the system 100, in other implementations, the system 100 may contain fewer components, additional components, different components, or differently arranged components than depicted in FIG. 1.

The processor(s) 102 may include circuitry implementing, among others, audio and logic functions associated with the communication. The processor(s) 102 may include, among other things, a clock, an arithmetic logic unit (ALU) and logic gates configured to support operation of the processor(s) 102. The processor(s) 102 can be a single processing unit or a number of units, all of which include multiple computing units. The processor(s) 102 may be implemented as one or more microprocessors, microcomputers, microcontrollers, digital signal processors, central processing units, state machines, logic circuitries, and/or any devices that manipulate signals based on operational instructions. Among other capabilities, the processor(s) 102 is configured to fetch and execute computer-readable instructions and data stored in the memory 104.

The functions of the various elements shown in the figure, including any functional blocks labeled as "processor(s)", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional, and/or custom, may also be included.

The interface(s) 106 may include a variety of software and hardware interfaces, for example, interfaces for peripheral device(s), such as a keyboard, a mouse, an external memory, and a printer. The interface(s) 106 can facilitate multiple communications within a wide variety of networks and protocol types, including wired networks, for example, local area network (LAN), cable, etc., and wireless networks, such as Wireless LAN (WLAN), cellular, or satellite. For the purpose, the interface(s) 106 may include one or more ports for connecting the system 100 to other devices.

The memory 104 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The memory 104, may store any number of pieces of information, and data, used by the system 100 to implement the functions of the system 100. The memory 104 may be configured to store information, data, applications, instructions or the like for enabling the system 100 to carry out various functions in accordance with various example embodiments. Additionally or alternatively, the memory 104 may be configured to store instructions which when executed by the processor(s) 102 causes the system 100 to behave in a manner as described in various embodiments. The memory 104 includes the compliance checking module 108 and/or other modules. The module 108 includes routines, programs, objects, components, data structures, etc., which perform particular tasks or implement particular abstract data types. The other modules may include programs or coded instructions that supplement applications and functions of the system 100.

In an embodiment, the compliance checking module 108 obtains the semantic model of the regulatory rules that are to be complied by an organization. The semantic model is built by an expert based on a model-driven architecture for rules based on OMG(Object Management Group)'s MDA(Model Driven Architecture) standard. The semantic model is a fact oriented knowledge base that captures rules and their dependence on fact types. The semantic model comprises of two layers (i) a computation independent model (CIM) and (ii) a platform independent model (PIM). The CIM is a specification of regulatory rules in a controlled natural language. Domain experts provide the specification of regulatory rules in domain language as CIM. The PIM is a fact-oriented model of regulatory rules. The fact-oriented formalism captures knowledge about the universe of discourse in the form of facts, also called fact types. Fact types are propositions about things in the universe of discourse. Examples of propositions are Customer holds account, account has balance. Customer, account and balance are concepts, or things in the universe of discourse. Rules are built by imposing modalities such as obligation and necessity onto compositions of fact types. The examples of rules are "It is obligatory that account has balance if customer holds account". The fact-oriented model thus represents knowledge in three layers: concepts, fact types based upon concepts, and rules based upon fact types. The fact types on which the rules are based denote the propositions whose truth value is determined for compliance checking. These fact types are utilized to construct the conceptual data model. The organization provides data as ground facts corresponding to the conceptual data model.

Figure 2:
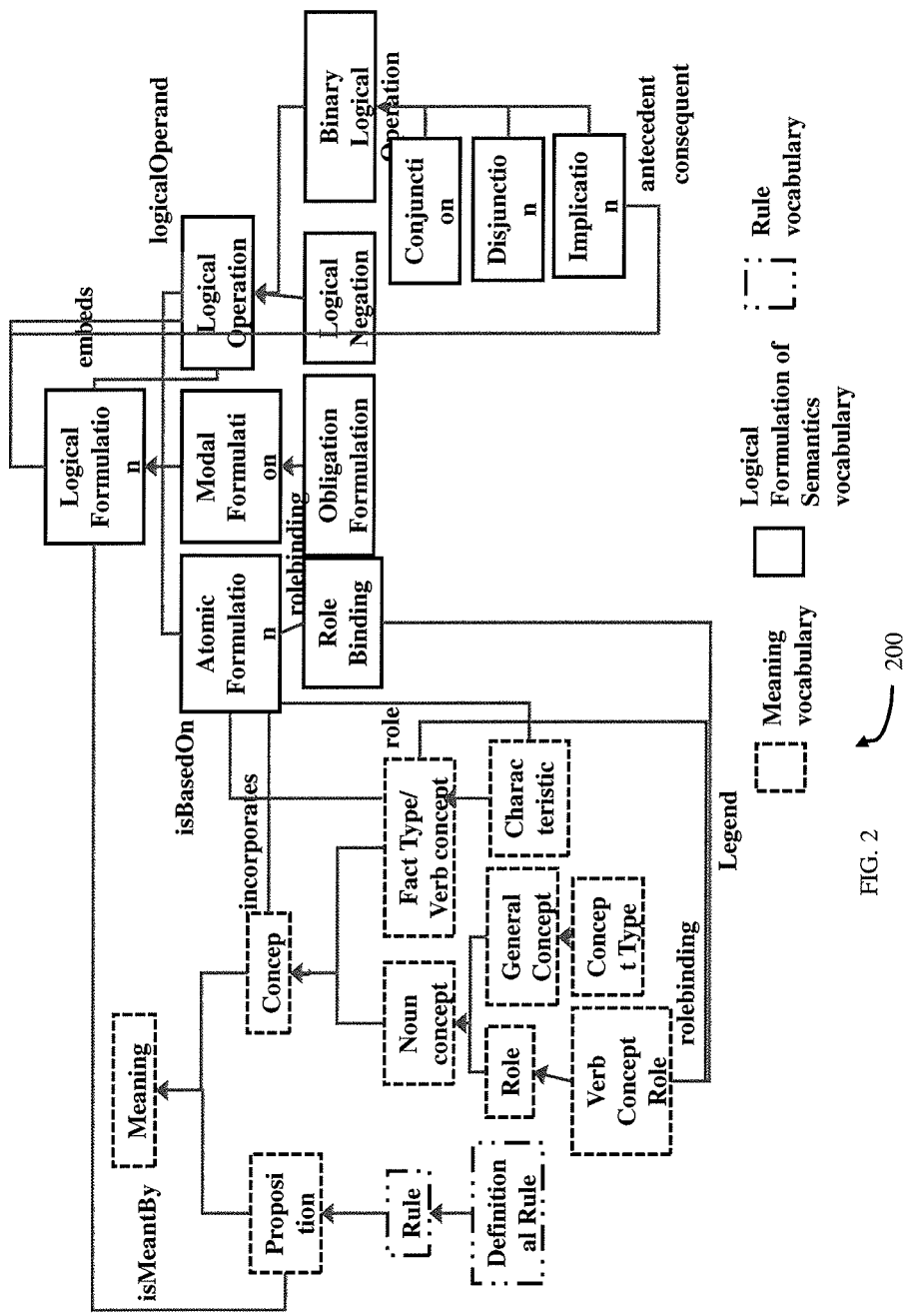
FIG. 2 is a meta-model subset of SBVR (Semantics of business vocabulary and rules) according to an embodiment of the present disclosure.

In an embodiment, the compliance checking module 108 obtains the semantic model for the regulation text created by the domain experts. The present disclosure utilizes Semantics of Business Vocabulary and Rules (SBVR) modelling language for representing regulatory rules and the ground facts of the organization. The vocabulary model based on SBVR meta-model from the OMG SBVR specification is generated. The SBVR model forms the basis for our automated compliance management approach. The SBVR model is used to generate rules and facts. FIG. 2 is a meta-model subset of SBVR according to an embodiment of the present disclosure. The meta-model of SBVR is used for processing the regulatory rules and ground facts of the organization for automated compliance regulatory checking. The arrows show the inheritance hierarchy or the relationship between parent entity and child entity. Role is child of noun concept that is in turn child of concept entity.

Figure 3:
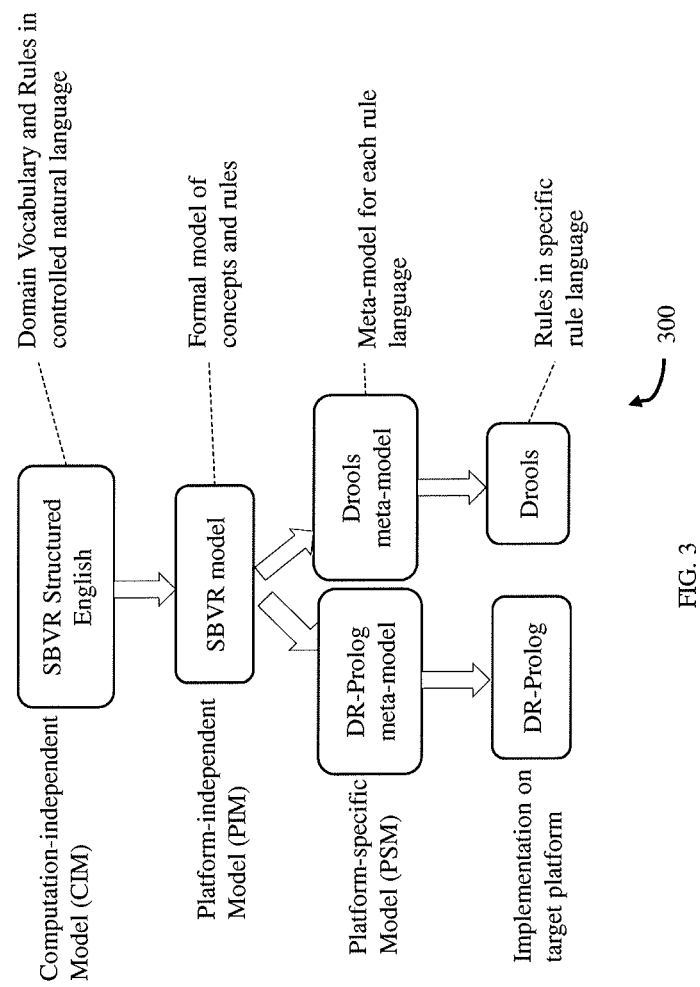
FIG. 3 is a model driven architecture using SBVR model for capturing regulatory rules, according to an embodiment of the present disclosure.

SBVR is a fact-oriented modeling language that captures rules as compositions of facts. SBVR is devised by OMG as a standard for capturing the vocabulary used by a business domain, definitions and relations between terms, and business rules governing the domain. FIG. 3 is a model-driven architecture using SBVR model for capturing regulatory rules, according to an embodiment of the present disclosure. The SBVR model majorly consists of meaning vocabulary, logical formulation of semantics vocabulary and rule vocabulary. The meaning vocabulary consists of concepts like noun concepts and verb concepts. The verb concepts are also called fact types. The logical formulation of semantics vocabulary handles logical formulation of fact types like conjunctions, implications, negations of atomic formulations. The rule vocabulary specifies rules based on logical formulations. SBVR model along with meaning vocabulary, logical formulation of semantics vocabulary and rule vocabulary provides a comprehensive meta-model for capturing the semantics of rules as logical formulations over fact types and concepts.

The compliance checking module 108 extracts a logical specification of rules from the semantic model of regulatory rules in DR-Prolog language. The constructs of the PIM are mapped to the constructs of DR-Prolog. The rule definition meta-model of DR-Prolog maps directly to the SBVR meta-model, since both are fact-oriented models. The compliance checking module 108 utilizes the mapping between the PIM and DR-Prolog constructs to generate the platform specific model (PSM) by performing model-to-model transformation. The compliance checking module 108 creates the PIM-PSM map between SBVR and DR-Prolog meta-models and uses it for transformation of the PIM instance to PSM instance. Further, the compliance checking module 108 translates the PSM instances to the logical specification of rules in DR-Prolog syntax. The logical specification of rules in DR-Prolog language is used for the purpose of automated compliance checking.

In an embodiment, the compliance checking module 108 extracts the conceptual data model from the semantic model of the regulatory rules to obtain the relevant information from the organization to perform automated compliance checking. The semantic model is built using the fact-oriented knowledge modeling technique, whereby the regulatory rules are captured as compositions of propositions that in turn are based on concepts from the information model used by the regulation. The fact-oriented model is traversed using an information model extraction algorithm, to arrive at the set of propositions whose truth value must be determined in order to evaluate whether the rule holds, and from these, the underlying concept model. The conceptual data model constitutes the necessary and sufficient model of information needed by the regulation, for determining compliance. The following algorithm is utilized to traverse the fact-oriented model to extract the conceptual data model For each rule in the semantic model, associated modal formulation is obtained using the following flow of rules.
1. association Rule→isMeantBy→ModalFormulation
2. For the modal formulation, obtain the embedded logical formulation using the association
3. ModalFormulation→hasEmbedded→LogicalFormulation
4. For the logical formulation, obtain its operand logical formulations
5. If it is a composite logical formulation, perform step 3 recursively until an atomic formulation is reached
6. For the atomic formulation, obtain the associated verb concept on which it is based
7. From the verb concept, obtain its associated verbconceptroles.
8. Each verbconceptrole derives from a noun concept, that denotes an entity of the conceptual data model. The identifying characteristic of the noun concept denotes the unique key of the entity.
9. Each verbconcept denotes a relation between the verbconceptrole entities.
10. Repeat steps 3-8 for each operand logical formulation
11. The set of verbconceptroles and verb concepts thus obtained constitutes the conceptual data model of the regulation.

In an embodiment, the compliance checking module 108 further obtains the schema mapping between the conceptual data model and plurality of physical database schema. The plurality of physical database schema are integrated using schema integration techniques. The integration of plurality of physical database schemas provide an integrated view of the data required for compliance checking from amongst the distributed data available with the organizations.

In an embodiment, the compliance checking module 108 generates queries on the conceptual data model that are further translated into queries on physical database schema. The queries on physical database schema extracts relevant data from the organization. The conceptual data model represents the data required from the organization. A model-to-model transformation is used to transform the conceptual data model from SBVR to a relational model and generate exhaustive SELECT queries on the relational model for extracting data. The queries on conceptual data model are further translated using conceptual-to-physical schema mapping to queries on the physical database schema. A proprietary tooling is used for the purpose of schema mapping and translation of a query on conceptual data model of databases into a semantically equivalent one on the integrated database. The compliance checking module 108 executes the queries on physical database schema to extract necessary data from the actual organization.

Further, the compliance checking module 108 transforms the extracted necessary data from the organization into ground facts in the DR-Prolog language for performing automated compliance checking.

Subsequently, the ground facts in DR-Prolog language are compared with the logical specification of rules obtained from the semantic model of the regulatory rules.

In an embodiment, an illustration for rules laid down in the MiFID-2 regulation for obligations on financial institutions regarding the type of transactions that must be included or excluded in reporting trades to the regulatory body is disclosed. The followings rules are the regulatory rules for transactions.

1. For the purposes of Article 26 of Regulation (EU) No 600/2014, the conclusion of an acquisition or disposal of a financial instrument referred to in Article 26(2) of Regulation (EU) No 600/2014 shall constitute a transaction.
2. An acquisition referred to in paragraph 1 shall include:
   a. a purchase of a financial instrument;
   b. entering into a derivative contract in a financial instrument.
3. A disposal referred to in paragraph 1 shall include:
   a. sale of a financial instrument;
   b. closing out of a derivative contract in a financial instrument.
4. A transaction for the purposes of Article 26 of Regulation (EU) No 600/2014 shall not include:
   a. a securities financing transaction as defined in Regulation [Securities Financing Transactions]
   b. a contract arising exclusively for clearing or settlement purposes;
   c. an acquisition or disposal that is solely a result of custodial activity;

The CIM of the regulatory rules is created by writing the above natural language regulation in structured English.

The inclusion and exclusion rules from the regulation text are encoded in SBVR SE as below.

Rule Inclusion: It is obligatory that transaction is included in MiFID reporting if the transaction is an acquisition or a disposal.

Rule Exclusion: It is obligatory that transaction is excluded from MiFID reporting if the transaction is a securities financing transaction or clearing or settlement contract or an acquisition or disposal arising from custodial activity.

The keywords 'It is obligatory that' denote the obligation modality of the rule.

Rule Inclusion is built upon fact types transaction is included in MiFID reporting, transaction is an acquisition, and transaction is a disposal. Transaction, acquisition, and disposal are concepts; is included in MiFID reporting is a characteristic of a transaction.

Acquisition and disposal are high-level concepts defined in terms of other concepts, e.g. purchase and sale. These definitions are captured as definitional rules as follows Acquisition is a purchase or entering a derivative contract.
Disposal is a sale or closing a derivative contract.
Purchase is further explicated by domain experts in terms of propositions on elements such as buyer and seller defined in the data description section in the regulation, as well as concepts such as trade type from their own knowledge of the domain.

Purchase is a transaction with trade type equal to Buy and transaction has buyer and transaction trades instrument and instrument is equities or bonds.

The CIM is subsequently translated to DR-Prolog syntax as shown below:

```
defeasible  (rule  inclusion,  obligation,  includeInMiFIDReporting
(TransRef),  [reportableTransaction(TransRef)]).
defeasible  (rule  exclusion,  obligation,
excludeInMiFIDReporting(TransRef), [exclusion
Transaction(TransRef )]).
```

Since the antecedent reportableTransaction of the inclusion rule is a disjunction of acquisition and disposal, the implications or simple DR-Prolog rules specifying this relation follow.

```
fact (reportableTransaction(TransRef )) :- fact
(acquisition(TransRef )).
fact (reportableTransaction(TransRef )) :- fact (disposal(TransRef )).
Definitional rules get translated as simple DR-Prolog rules, as
fact (acquisition(TransRef )) :- fact (purchase(TransRef )).
fact (acquisition(TransRef )) :- fact
(enteringDerivativeContractInFI(TransRef
)).
```

Figure 4:
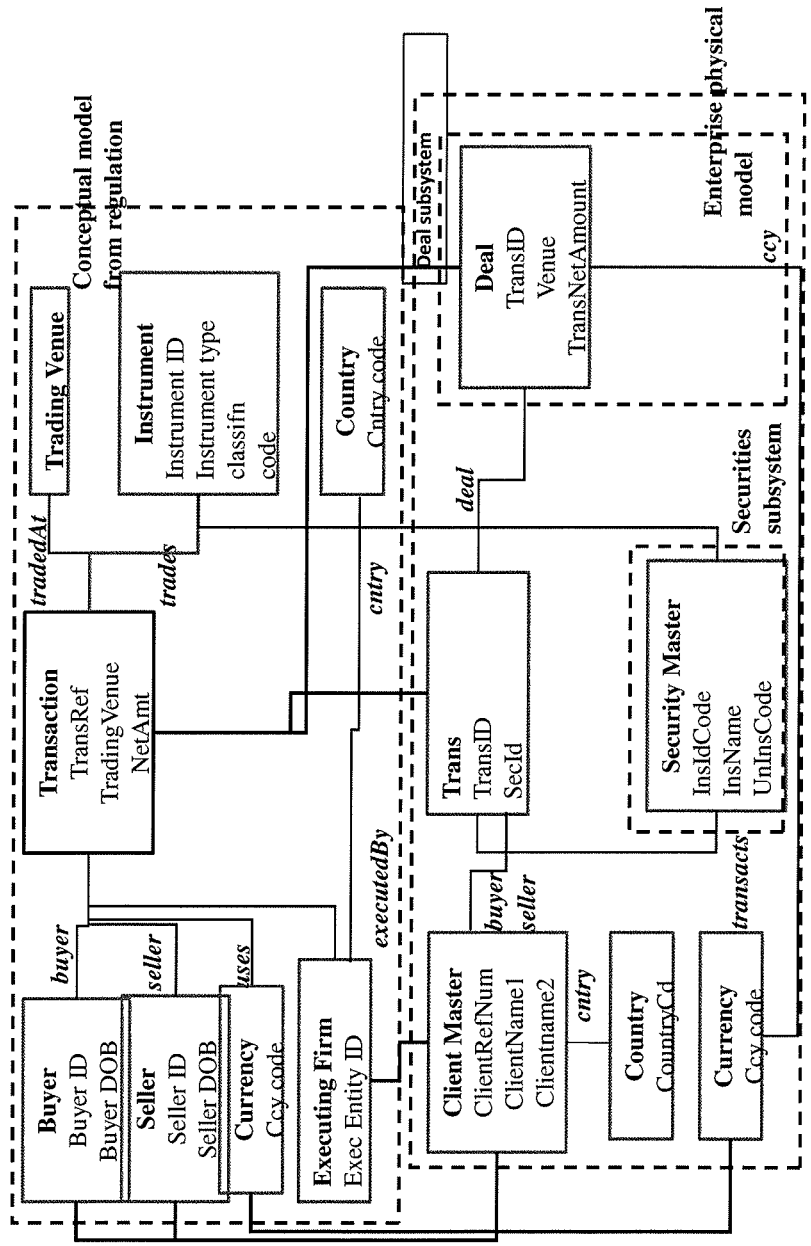
FIG. 4 is an illustration of the conceptual model of regulatory rules and associated mapping to physical database schema of an organization, according to an embodiment of the present disclosure.

The conceptual data model of the regulatory rules is obtained and mapping is performed with the physical database. FIG. 4 is an illustration of the conceptual model of regulatory rules and associated mapping to physical database schema of an organization, according to an embodiment of the present disclosure. The illustration comprises of regulatory rules, leaf-level concepts and fact types from all of the defined rules, such as the concepts transaction and trade type, and facts trade type equal to Buy, and transaction has buyer from the definition of purchase.

Subsequently, the data is extracted from the physical database schema for components sub-systems, such as Deal and Securities sub-systems seen in FIG. 4. The Transaction concept from the regulation schema maps to the Trans and Deal tables from the enterprise Deal sub-system database, while Instrument maps to the Security Master table from the Securities sub-system. Buyer, Seller and Executing Firm entities from the conceptual schema map to the Client Master table of the enterprise database. Individual characteristics of concepts such as transaction are mapped to columns of corresponding tables, in this case Trans and Deal.

Two samples of the queries generated are mentioned below.

```
1) SELECT * FROM Transaction ;
2) SELECT * FROM Instrument i , Transaction t
where i. InstrumentID = t. InstrumentID ;
```

These queries are translated into queries on corresponding enterprise tables 1) Trans and Deal, and 2) Securities respectively. The translated query corresponding to query 1) is shown below

```
SELECT t1.TransID ,
    t1.TradeType ,
    t1.InstActionCode ,
    t1.TrdDateAndTime ,
    t1.TrdCap ,
    t1.TradeQty ,
    t1.QuanCcy ,
    t1.TradePrice ,
    t1.PriceCurrency ,
    t1.TransNetAmount ,
    t2.transType ,
    t2.PTSTransactionCode ,
    t1.Venue ,
    t2.SecId ,
    t2.BuyerRefNum ,
    t2.SellerRefNum
    FROM DealSchema.Deal t1 , TradeSchema. Trans t2
    WHERE t1.TransID = t2.TransID
```

The listing of two sample sets of ground facts extracted from the enterprise database, for a Purchase and a Closing a derivative contract transaction is shown below.

```
/* Set 1 : Purchase transaction */
fact ( transaction ( ' 1010000023TATA' , ' ' , 'Buy ' , 'NEWT' , '
2015-1-06T09 : 16 : 36 : 143232 ' , 'MTCH' , 2500 , , 150 ,
' INR ' , 375000) ) .
fact ( instrument ( ' INE467B01029 ' , 'ESXXXX ' ) ) .
fact ( currency ( ' INR ' , , ' Active ' ) ) .
fact ( tradedAt ( ' 1010000023TATA' , 'XXXX' ) ) .
fact ( trades ( ' 1010000023TATA' , ' INE467B01029 ' ) ) .
```

Therefore, the process of a) conversion of rules from MiFID-2 regulation NL text into rules in DR-Prolog language, and b) discovering the conceptual model of the MiFID-2 regulation from regulation text, and mapping it to the physical data model of the bank, as well as automated extraction of relevant data from the bank's databases in the form of facts, for checking compliance to the regulation.

Figure 5:
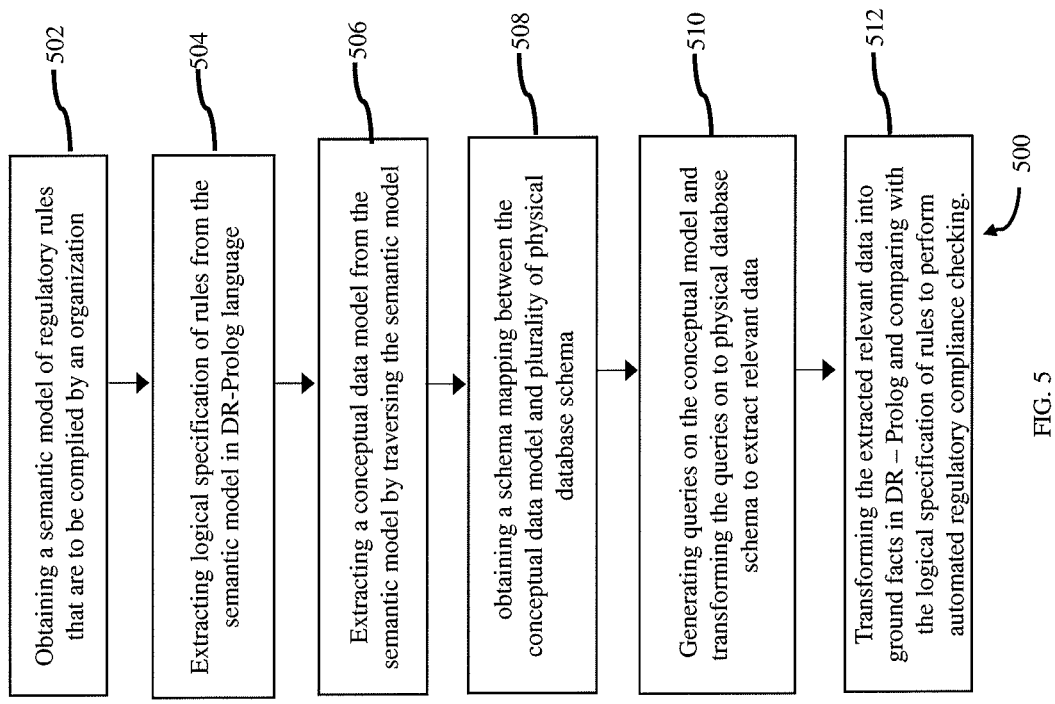
FIG. 5 is a flow chart illustrating a method for automated regulatory compliance checking for organizations, according to an embodiment of the present disclosure.

FIG. 5 is a flow chart illustrating a method for automated regulatory compliance checking for organizations, according to some embodiment of the present subject matter. At block 502, a semantic model of regulatory rules that are to be complied is obtained. At block 504, logical specification of rules are extracted from the semantic model in the DR-Prolog language. At block 506, a conceptual data model is extracted from the semantic model by traversing the semantic model. At block 508, a schema mapping is obtained between the conceptual data model and plurality of physical database schema. At block 510, queries are generated on the conceptual data model that are further transformed to queries on the physical database schema to extract the relevant data. At block 512, the extracted relevant data is transformed into ground facts in DR-Prolog language and it is compared to logical specification of rules to perform automated regulatory compliance checking.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant arts based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A computer implemented method for automated regulatory compliance checking for organizations, the method comprising of:

obtaining a semantic model of regulatory rules that are to be complied by an organization, wherein the semantic model comprises of at least two layers, (i) a computation independent model (CIM) and (ii) a platform independent model (PIM);

extracting a logical specification of rules from the semantic model of regulatory rules in DR (Defeasible reasoning)-Prolog language;

extracting a conceptual data model of the regulatory rules from the semantic model by traversing the semantic model, wherein the conceptual data model comprises propositions that depend on regulatory rules;

obtaining a schema mapping between the conceptual data model and a plurality of physical database schemas of the organization;

generating queries on the conceptual data model by transforming the conceptual data model to a relational model using model-to-model transformation and translating the queries on the plurality of physical database schema by utilizing the schema mapping to extract relevant data from the organization;

transforming the extracted relevant data into ground facts in the DR-Prolog language using model-to-text transformation for performing automated compliance checking; and performing automated regulatory compliance checking for the organization based on the logical specification of rules and the ground facts.

2. The computer implemented method of claim 1, wherein the CIM is a specification of regulatory rules in a controlled natural language and the PIM is a fact-oriented model of regulatory rules.

3. The computer implemented method of claim 2, wherein the fact oriented model is a model comprising rules dependent on fact types and concepts.

4. The computer implemented method of claim 1, wherein the logical specification of rules is generated from a platform-specific model of regulatory rules that are derived from the PIM of the semantic model.

5. The computer implemented method of claim 1, wherein extracting the logical specification of rules includes generating regulatory rule specification from the platform specific model using model-to-text transformation.

6. A system for automated regulatory compliance checking for organizations, the system comprising of:
    at least one processor; and
    a memory communicatively coupled to the at least one processor, wherein the memory comprises
    a compliance checking module to:
        obtain a semantic model of regulatory rules that are to be complied by an organization, wherein the semantic model comprises of at least two layers, (i) a computation independent model (CIM) and (ii) a platform independent model (PIM);
        extract a logical specification of rules from the semantic model of regulatory rules in DR (Defeasible reasoning)-Prolog language;
        extract a conceptual data model of the regulatory rules from the semantic model by traversing the semantic model, wherein the conceptual data model comprises propositions that depend on regulatory rules;
        obtain a schema mapping between the conceptual data model and a plurality of physical database schemas of the organization;
        generate queries on the conceptual data model by transforming the conceptual data model to a relational model using model-to-model transformation and translating the queries on the plurality of physical database schema by utilizing the schema mapping to extract relevant data from the organization;
        transform the extracted relevant data into ground facts in the DR-Prolog language using model-to-text transformation for performing automated compliance checking; and
        perform automated regulatory compliance checking for the organization based on the logical specification of rules and the ground facts.

7. The system of claim 6, wherein the CIM is a specification of regulatory rules in a controlled natural language and the PIM is a fact-oriented model of regulatory rules.

8. The system of claim 7, wherein the fact oriented model is a model comprising rules dependent on fact types and concepts.

9. The system of claim 6, wherein the logical specification of rules is generated from a platform-specific model of regulatory rules that are derived from the PIM of the semantic model.

10. The system of claim 6, wherein extracting the logical specification of rules includes generating regulatory rule specification from the platform specific model using model-to-text transformation.

11. A non-transitory computer readable medium embodying a program executable in a computing device for automated regulatory compliance checking for organizations, the program comprising:
    a program code for obtaining a semantic model of regulatory rules that are to be complied by an organization, wherein the semantic model comprises of at least two layers, (i) a computation independent model (CIM) and (ii) a platform independent model (PIM);
    extracting a logical specification of rules from the semantic model of regulatory rules in DR (Defeasible reasoning)-Prolog language;
    extracting a conceptual data model of the regulatory rules from the semantic model by traversing the semantic model, wherein the conceptual data model comprises propositions that depend on regulatory rules;
    obtaining a schema mapping between the conceptual data model and a plurality of physical database schemas of the organization;
    generating queries on the conceptual data model by transforming the conceptual data model to a relational model using model-to-model transformation and translating the queries on the plurality of physical database schema by utilizing the schema mapping to extract relevant data from the organization;
    transforming the extracted relevant data into ground facts in the DR-Prolog language using model-to-text transformation for performing automated compliance checking; and
    performing automated regulatory compliance checking for the organization based on the logical specification of rules and the ground facts.

* * * * *